United States Patent [19]

Yamaguchi et al.

[11] 4,030,464

[45] June 21, 1977

[54] FUEL-AIR MIXTURE HEATING DEVICE FOR USE WITH INTERNAL COMBUSTION ENGINE

[75] Inventors: Shunzo Yamaguchi, Nishio; Tadashi Ozaki, Gamagori; Toshiaki Konomi, Susono, all of Japan

[73] Assignees: Nippon Soken, Inc., Nishio; Toyota Jidosha Kogyo Kabushiki Kaisha, Toyota, both of Japan

[22] Filed: Nov. 27, 1974

[21] Appl. No.: 527,762

[30] Foreign Application Priority Data

Dec. 7, 1973 Japan .......................... 48-137175
Apr. 23, 1974 Japan .......................... 49-46150

[52] U.S. Cl. .................. 123/122 AC; 123/122 AB; 123/122 G; 123/119 A; 123/179 H
[51] Int. Cl.[2] ...................................... F02M 31/00
[58] Field of Search ....... 123/122 C, 179 H, 119 A, 123/122 AC, 122 AB

[56] References Cited

UNITED STATES PATENTS

| | | | |
|---|---|---|---|
| 1,064,086 | 6/1913 | Porter | 123/122 G |
| 1,076,823 | 10/1913 | Friedman | 123/122 G |
| 1,448,651 | 3/1923 | Weelson | 123/122 G |
| 1,843,257 | 2/1932 | Weelson | 123/122 G |
| 2,225,647 | 12/1940 | Liekendael | 123/122 G |
| 3,237,615 | 3/1966 | Daigh | 123/119 A |
| 3,762,384 | 10/1973 | Day | 123/119 A |
| 3,796,049 | 3/1974 | Hayashi | 123/119 A |
| 3,828,747 | 8/1974 | Nambu | 123/122 G |
| 3,980,052 | 9/1976 | Noguchi | 123/122 AC |

*Primary Examiner*—Ronald H. Lazarus
*Attorney, Agent, or Firm*—Cushman, Darby & Cushman

[57] ABSTRACT

A fuel-air mixture heating device for use with an internal combustion engine wherein a combustion chamber of an auxiliary burner is disposed adjacent to an intake manifold of the engine for heating the same, said combustion chamber being communicated with said intake manifold through a control valve which varies its opening degree in response to a parameter or signal representative of at least one of the operating conditions of the engine.

12 Claims, 6 Drawing Figures

4,030,464

FUEL-AIR MIXTURE HEATING DEVICE FOR USE WITH INTERNAL COMBUSTION ENGINE

BACKGROUND OF THE INVENTION

The present invention relates to a fuel-air mixture heating device for use with an internal combustion engine of the type which heats the intake manifold by an auxiliary burner, thereby attaining the complete combustion of the fuel-air mixture.

In the conventional fuel-air mixture heating devices, a part of the intake manifold at the downstream side of the carburetor is heated by exhaust gases or by the water circulating through the cooling system, or the intake manifold is heated by a burner formed integral with the intake manifold. In the former devices, the intake manifold cannot be heated above 100°C because the water in the cooling system will not rise above 100°C. In the devices of the type utilizing the exhaust gases, a passage for the exhaust gases is provided in the wall of the intake manifold so that it is also extremely difficult to heat the fuel-air mixture above 100°C. When the exhaust gases heat the intake manifold too much, the temperature of the exhaust gases drops to such an extent that the efficiency of the catalytic converter for purifying the exhaust gases drops. Thus both of the heating devices utilizing the exhaust gases and the cooling water are not so effective that some of the atomized fuel particles are delivered into the engine cylinders without being completely vaporized, resulting in the unsatisfactory fuel-air mixture distribution especially in case of a multi-cylinder engine. Consequently, the smooth engine operation is not ensured in case of the acceleration or deceleration. To overcome these problems, the rich fuel-air mixture must be delivered to the engine cylinders. In the fuel-air mixture heating devices of the type which heat the mixture by means of a burner formed integral with the intake manifold, a part of the intake manifold may be easily raised in temperature above 100°C, but the combustion products from the burner are discharged into the surrounding atmosphere or recirculated through the air conditioning system for automobiles after they have been used to heat the intake manifold. Consequently, the combustion gases containing toxic components are directly discharged into the surrounding atmosphere or the compartment of the automobile if the combustion conditions in the burner are not satisfactory. The emission of the toxic pollutants must be prevented in view of atmospheric pollution and the safety of the driver and passengers.

SUMMARY OF THE INVENTION

The present invention was made to overcome the above and other defects and problems encountered in the conventional fuel-air mixture heating devices, and has for its object to provide an improved fuel-air mixture heating device for use with internal combustion engines wherein the intake manifold is heated by the heat of the combustion in an auxiliary burner disposed adjacent to the intake manifold so that the fuel-air mixture delivered from the carburetor may be sufficiently preheated before it is charged into the engine cylinders, wherein the combustion products discharged from the auxiliary burner are discharged into the intake manifold. However, when the combustion chamber of the auxiliary burner and the intake manifold are directly communicated with each other, the negative pressure in the intake manifold is admitted into the combustion chamber so that the stable and complete combustion in the auxiliary burner is not ensured. To overcome this problem, according to the present invention, the intake manifold and the combustion chamber in the auxiliary burner are communicated with each other through a control valve which varies its opening degree in response to a parameter or signal representative of the operating conditions of the engine so as to control the negative pressure admitted into the combustion chamber, thereby ensuring the stable and complete combustion in the auxiliary burner.

According to one embodiment of the present invention an exhaust gas recirculating pipe extends from the exhaust manifold of the engine to pipe intercommunicating the intake port of the control valve and the combustion chamber in the auxiliary burner, so that the content of nitrogen oxides in the exhaust gases may be reduced.

According to another embodiment of the present invention, an air control valve, which varies its opening in response to a parameter or signal representative of the operating conditions of the engine, is interposed between an air pump and the combustion chamber in the auxiliary burner so that the flow rate of the air to be delivered from the air pump into the combustion chamber may be controlled. As a result, the combustion in the auxiliary burner is so controlled in accordance with the quantity of the fuel-air mixture demanded by the engine that the intake manifold may be satisfactorily heated to a temperature not higher or not lower than a suitable required temperature.

BRIEF DESCRIPTION OF THE DRAWINGS

Same reference numerals are used to designate similar parts throughout the figures.

DESCRIPTION OF THE PREFERRED EMBODIMENTS

Figure 1:
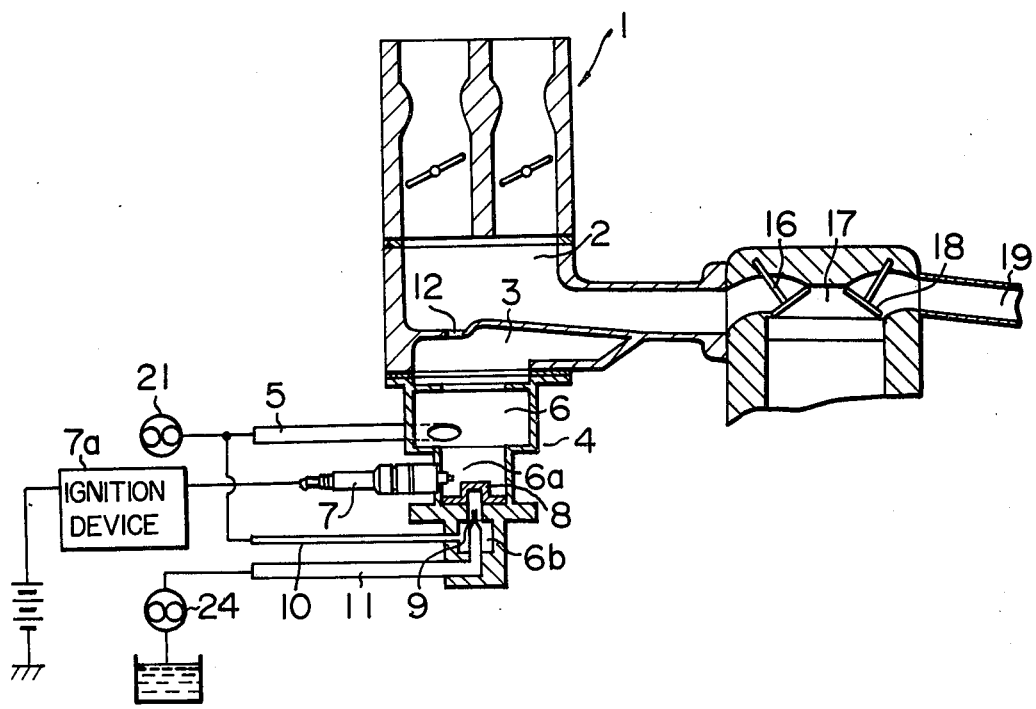
FIG. 1 is a schematic sectional view illustrating the fundamental arrangement of a fuel-air mixture heating device in accordance with the present invention.

Fundamental Arrangement, FIG. 1

Referring first to FIG. 1, the fundamental arrangement of the present invention will be described to explain the underlying principle thereof. One end of an intake manifold 2 is connected to the lower end of a carburetor barrel 1 while the other end is fastened in the conventional manner to an engine cylinder shown as comprising an intake valve 16, a combustion chamber 17, an exhaust valve 18, and an exhaust manifold 19. The intake manifold 2 is also communicated through a port 12 provided on its lower wall with a heat-exchanging chamber 3 which in turn is communicated with a combustion chamber 6 of an auxiliary burner generally indicated by 4. Any suitable burner may be employed as far as the stable ignition and combustion of the fuel-air mixture are ensured even under the negative pressure admitted from the intake manifold 2, and in the instant arrangement, the auxiliary burner 4 is of the turbulent type. The auxiliary burner 4 further comprises an ignition chamber 6a at the bottom of which is disposed an evaporator 8. The combustion chamber 6 is supplied with the air through an air pipe 5 from an air pump 21. A spark plug 7 screwed into the side wall of the ignition chamber 6a is electrically connected to an ignition device 7a. The ignition chamber 6a is communicated through the evaporator 8 with a mixing chamber 6b which is also supplied with air through another air pipe 10 from the air pump 21. A fuel injection nozzle 9 which is communicated through a fuel pipe 11 with a fuel pump 24, is disposed in such a way that the nozzle port opens immediately below the evaporator 8. The fuel injection nozzle 9 serves to meter and atomize the fuel supplied under pressure from the fuel pump 24.

Next to the mode of operation will be described. In the mixing chamber 6b, the fuel supplied from the fuel pump 24 through the fuel pipe 11 and injected from the nozzle 9 is mixed with air supplied from the air pump 21 through the air pipe 11 and atomized. The fuel-air mixture flows through the evaporator 8 into the ignition chamber 6a where the mixture is ignited by the spark plug 7, and the complete combustion takes place in the combustion chamber 6 with the air supplied from the air pump through the air pipe 5. The air pipe 5 opens at the cylindrical side wall of the combustion chamber 6 in such a way that the air may be discharged at a tangent to the cylindrical side wall and swirled within the combustion chamber 6, thereby ensuring stable combustion. The combustion products or gases flow from the combustion chamber 6 into the heat-exchanging chamber 3 so that the intake manifold 2, which partly defines the former, is heated. Consequently, the fuel-air mixture from the carburetor to be delivered into the engine cylinders may be heated so that the fuel particles in the mixture may be completely vaporized. From the heat-exchanging chamber 3, the combustion products or gases flow into the intake manifold 2 through port 12. Thus the direct discharge of the combustion products containing the pollutants into the surrounding atmosphere may be prevented.

Figure 2:
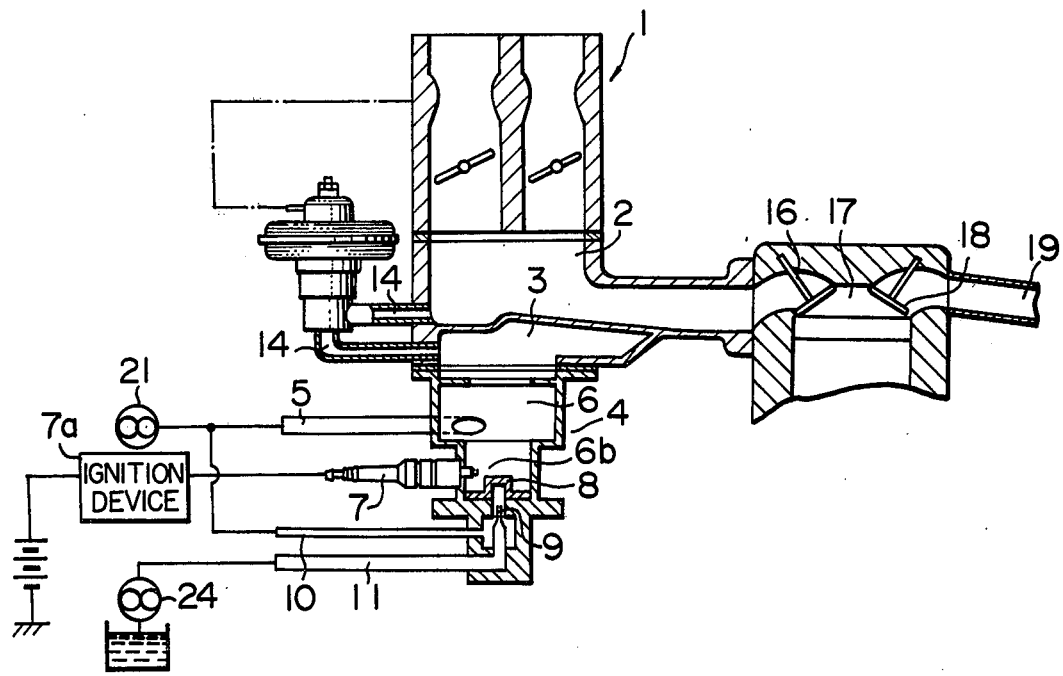
FIG. 2 is a schematic sectional view of a first embodiment of the present invention.
Figure 4:
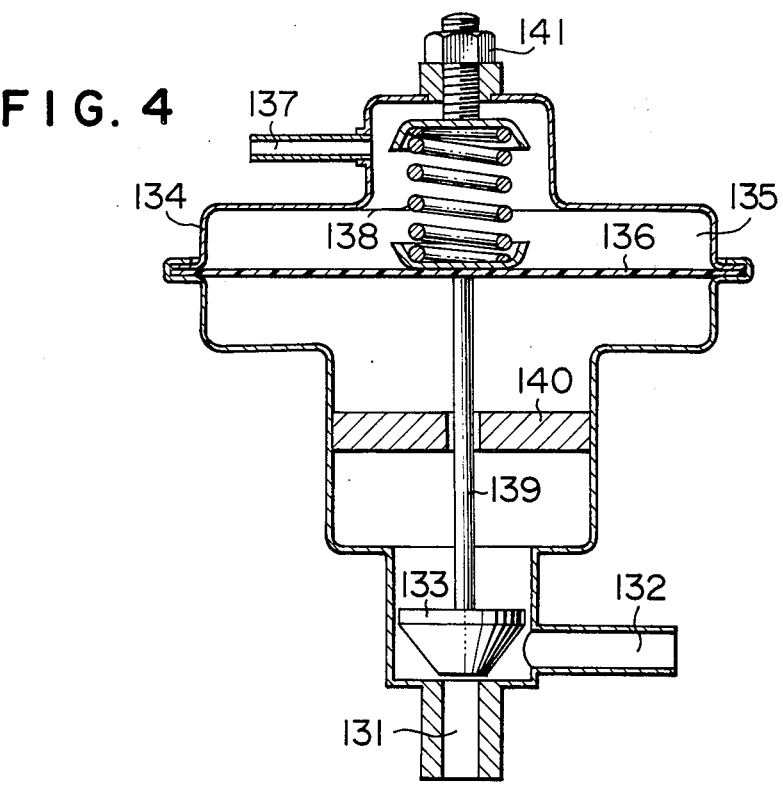
FIG. 4 is a schematic sectional view of a control valve which is used in both first and second embodiments shown in FIGS. 2 and 3, respectively.

First Embodiment, FIGS. 2 and 4

In the fundamental arrangement described so far with reference to FIG. 1, the intake manifold 2 is directly communicated through the port 12 with the combustion chamber 6 in the auxiliary burner 4 so that the combustion in the burner 4 is unstable under the negative intake pressure. The first embodiment of the present invention which was made to overcome the above problem is substantially similar in construction to the fundamental arrangement with the exception that, as shown in FIG. 2, the intake manifold 2 is communicated with the heat-exchanging chamber 3 of the burner 4 through a pipe 14 inserted with a control valve 13 adapted to control the rate of the exhaust or combustion gases flowing through the pipe 14.

As shown in FIG. 4, the control valve 13 comprises an intake pipe 131 through which flows the combustion gases from the burner 4 into the control valve 13; a discharge pipe 132 in communication with the intake manifold 2; a valve 133 vertically movably interposed between the intake and discharge pipes 131 and 132 for establishing or interrupting the fluidic communication therebetween; a diaphragm 136 which, together with a valve cover 134, defines a working pressure chamber 135; an input pipe 137 opening into the working pressure chamber 135 for transmitting thereto the signal pressure such as the venturi pressure as a parameter representing the operating conditions of the engine; a spring 138 disposed within the working pressure chamber 135 for limiting or controlling the displacement of the diaphragm 136; a valve rod 139 having its upper and lower ends fastened to the diaphragm 136 and the valve 133, respectively; a guide member 140 which not only guides the valve rod 139 but also seals it; and an adjusting screw 141 for adjusting the biasing pressure of the spring 138.

Next, referring to FIGS. 2 and 4, the mode of operation of the first embodiment with the above construction will be described hereinafter. The combustion gases, which are produced in the combustion chamber 6 of the burner 4, flow into the heat-exchanging chamber 3 to heat the intake manifold, and therafter are discharged through the pipe 14 and the control valve 13 into the intake manifold 2. In the instant embodiment, the venturi pressure produced in the carburetor 1 is admitted through the input pipe 137 into the working pressure chamber 135 of the control valve 13 so that the opening degree or position of the valve 133 is dependent upon the engine's demand for the air supply and that the negative pressure admitted into the combustion chamber 6 of the burner 4 is dependent upon the volume of the air following into the carburetor 1. In other words, as the quantity of the fuel-air mixture to be delivered to the engine cylinders is greater, the negative pressure admitted into the combustion chamber 6 is more negative while as the quantity of the fuel-air mixture is less, the negative pressure is less negative. Thus the stable combustion in the burner 4 may be ensured.

In the first embodiment, the venturi negative pressure has been described as being admitted into the working pressure chamber 135, but it is understood that any pressure signal representing the operating conditions of the engine may be admitted.

Figure 3:
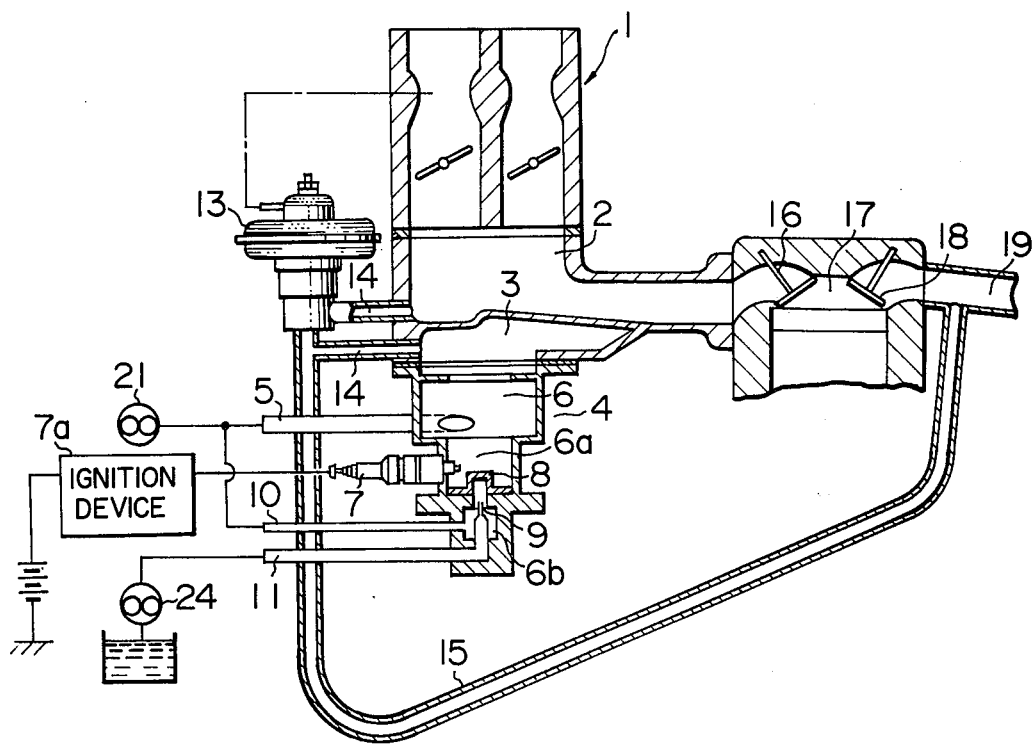
FIG. 3 is a schematic sectional view of a second embodiment of the present invention.

Second Embodiment, FIGS. 3 and 4

The second embodiment shown in FIG. 3 is substantially similar in construction to the first embodiment shown in FIG. 2 except that the pipe 14 between the heat-exchanging chamber 3 of the burner 4 and the control valve 13; that is, the intake pipe 131 (See FIG. 4) is communicated through an exhaust gas recirculating pipe 15 with the exhaust manifold 19. The control valve 13 is of the type described in detail hereinbefore with particular reference to FIG. 4 so that depending upon the operating conditions of the engine, the combustion gases from the burner 4 and the recirculated exhaust gases from the exhaust manifold 19 may be discharged into the intake manifold 2. Thus the nitrogen oxide (NOx) emission may be considerably reduced by the recirculation of the exhaust gases. On the other hand, when the engine's demand for the fuel-air mixture is less so that the opening degree of the control valve is small, the combustion gases from the burner 14 are discharged through the pipe 15 into the exhaust manifold 19. That is, the quantity of fuel burnt in the burner 4 is so limited or controlled as to satisfactorily heat the intake manifold only to a required temperature, and the combustion gases from the burner 4 are discharged either into the intake or exhaust manifold. Moreover, depending upon the operating conditions of the engine, the combustion gases and/or exhaust gases in quantity exactly meeting the engine's demand are discharged and recycled into the intake manifold. Thus the recirculation of the exhaust gases may be effected under a highly precise control.

Figure 5:
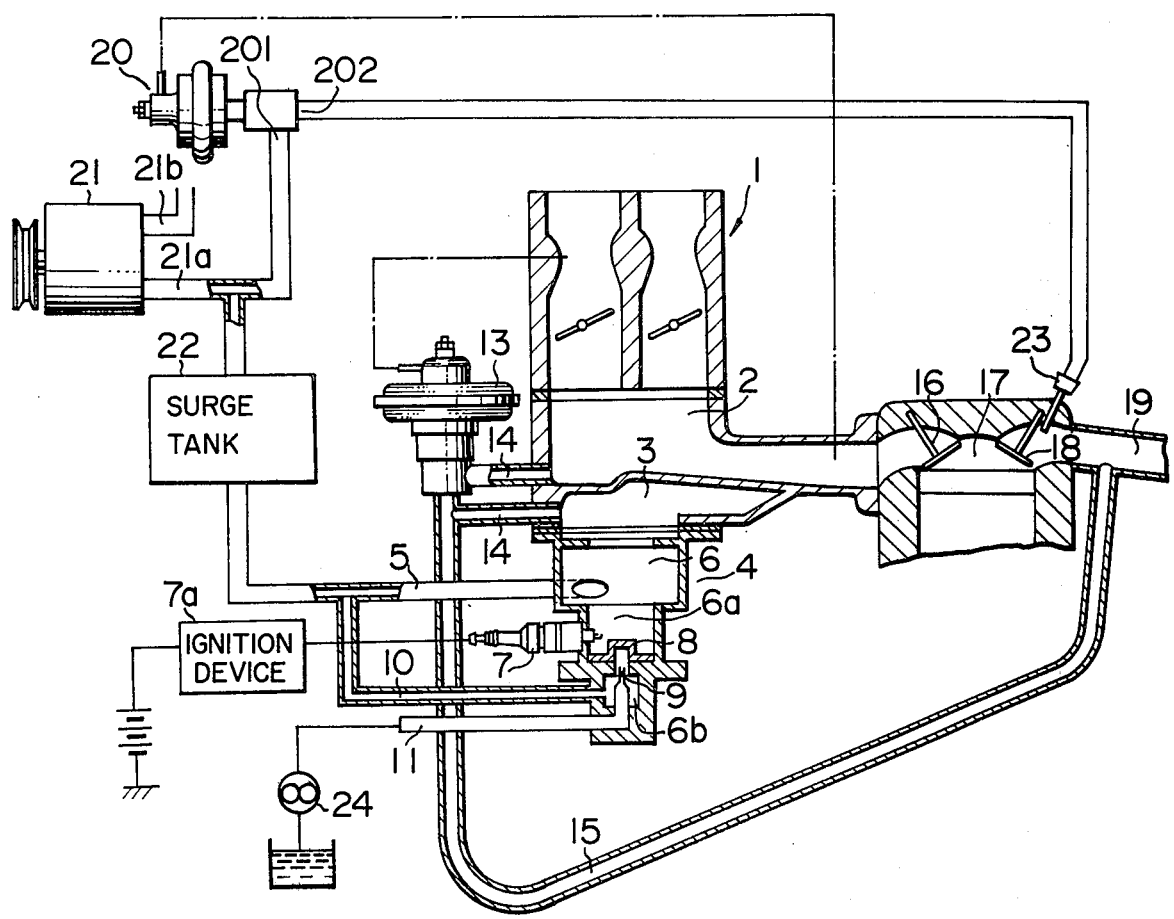
FIG. 5 is a diagrammatic view, partly in section, of a third embodiment of the present invention.
Figure 6:
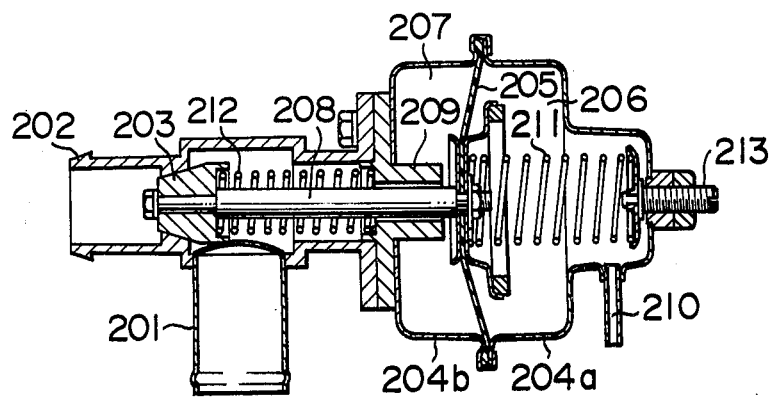
FIG. 6 is a schematic sectional view of an air control valve used in the third embodiment.

Third Embodiment, FIGS. 5 and 6

The important feature of the third embodiment shown in FIG. 5 is its ability to control the combustion in the auxiliary burner 4 in such a way that the intake manifold 2 may be heated to a suitable temperature not higher or not lower than a temperature that is required. The third embodiment is substantially similar in construction to the second embodiment shown in FIG. 3 with the exception that both the air pipes 5 and 10 are communicated with a discharge port 21a of the air pump 21 through a surge tank 22 which may absorb the pulsation of the air discharged from the air pump 21; and the discharge port 21a of the air pump 21 is communicated through an air control valve 20 with an air injection nozzle 23 which opens into the exhaust port in the vicinity of the exhaust valve 18 in order to supply the exhaust gases with the secondary air so that the unburnt components in the exhaust gases may be oxidized and purified.

As shown in FIG. 6, the air control valve 20 comprises an intake port 201 in communication with the discharge port 21a of the air pump 21; a discharge port 202 in communication with the air injection nozzle 23; a valve 203 which is horizontally movably disposed between the intake and discharge ports 201 and 202 in order to control the sectional area of the passageway therebetween; a pair of diaphragm casings 204a and 204b; a diaphragm 205; a first pressure chamber 206 defined by the casing 204a and the diaphragm 205; a second pressure chamber 207 defined by the casing 204b and the diaphragm 205; a valve rod 208 interconnecting the valve 203 and the diaphragm 205; a guide member 209 for the valve rod 208; an input signal admitting port 210 for admitting into the first pressure chamber 206 the signal pressure representative of the operating conditions of the engine; an adjusting spring 211 interposed within the first pressure chamber 206 between the diaphragm 205 and an adjusting screw 213; and a fine adjustment spring 212 interposed between the valve 203 and the guide member 209. The spring forces of both the adjustment springs 211 and 212 may be adjusted by turning the adjusting screw 213.

In the instant embodiment, the negative pressure in the intake manifold 2 is admitted into the first pressure chamber 206 through the signal pressure admitting port 210. The air discharged from the air pump 21 is admitted into the second pressure chamber 207 through the clearance between the valve rod 208 and the guide member 209.

Next the mode of operation of the third embodiment with the above construction will be described hereinafter. The air discharged from the air pump 21 flows into the surge tank 22 and the intake port 201 of the air control valve 20. The degree of opening or position of the valve 203 is dependent upon the displacement of the diaphragm 205 which in turn is dependent upon the difference between the negative pressure in the intake manifold admitted into the first pressure chamber 206 and the pressure of the air discharged from the air pump 21 and admitted into the second working pressure chamber 207. In case of engine acceleration, the opening degree of the valve 203 is smaller than in case of the steady or normal engine operation so that the quantity of the secondary air to be delivered to the air injection nozzle 23 for oxidizing and purifying the exhaust gases is decreased while the quantity of the air to be delivered to the auxiliary burner 4 is increased. That is, the combustion in the burner 4 is accelerated in case of the engine acceleration, thereby effectively heating the intake manifold 2. A part of the air discharged from the air pump 21 is delivered through the air pipe 10 into the mixing chamber 6b of the burner 4 while the fuel is delivered from the fuel pump 24 through the fuel pipe 11 to the fuel injection nozzle 9 which injects the fuel into the mixing chamber 6b. The quantity of the fuel injected is in proportion to the flow rate or volume of the air discharged from the air pipe 10 into the mixing chamber. As with the first and second embodiments, the fuel-air mixture flows through the evaporator 8 into the ignition chamber 6a and is ignited by the spark plug 7. The complete combustion of the air-fuel mixture is carried out in the combustion chamber 6 with the air delivered through the air pipe 5 from the air pump 21. The combustion products or gases flow into the heat-exchanging chamber 3, and heat the intake manifold 2.

The excess air delivered from the discharge port 202 of the air control valve 30 is injected through the air injection nozzle 23 into the exhaust port, whereby the unburnt components in the exhaust gases are oxidized and purified. In case of the engine equipped with the catalytic converter type exhaust gas emission control system, the excess air may be injected upstream in this system so that the effective purification of the exhaust gases may be effected.

In the third embodiment, the opening degree of the air control valve has been described as being controlled in response to the difference between the negative pressure in the intake manifold admitted into the first working pressure chamber and the discharge pressure of the air pump admitted into the second pressure chamber, but it is to be understood that the air control valve may be so arranged as to be fluidly or electromagnetically in response to any suitable signals or parameters representative of the operating conditions such as the air consumption, the rotational speed of the engine and so on.

What is claimed is:
1. In an internal combustion engine including an intake pipe and an exhaust pipe,
   a system for heating the intake pipe of the internal combustion engine comprising:
   a combustion equipment disposed adjacent to said intake pipe for heating the same, and including a combustion chamber for burning an air-fuel mixture therein, and an ignition device disposed in said combustion chamber for igniting the air-fuel mixture;
   air supply means for supplying air to said combustion equipment;
   fuel supply means for supplying fuel to said combustion equipment, the amount of fuel being in proportion to the amount of air supplied to said combustion equipment;
   pipe means provided between said intake pipe of said internal combustion engine and said combustion equipment for operatively communicating said combustion equipment with said intake pipe; and valve means disposed in said pipe means for opening the passage of said pipe means to thereby communicate said combustion equipment with said intake pipe and for keeping the pressure in said combustion chamber around atmospheric pressure to enable the stable combustion of said air-fuel mixture in said combustion chamber, said valve means responding to at least one of the parameters representing the operating conditions of said internal combustion engine to control the opening degree of said passage, whereby the amount of burned gas in said combustion equipment to be supplied to said intake pipe through said pipe means is controlled to enable the optimum combustion of the air-fuel mixture in said combustion equipment.

2. In an internal combustion engine including an intake pipe and an exhaust pipe, a system for heating the intake pipe of the internal combustion engine comprising:

a combustion equipment disposed adjacent to said intake pipe for heating the same, and including a combustion chamber for burning an air-fuel mixture therein, and an ignition device disposed in said combustion chamber for igniting the air-fuel mixture;

air supply means for supplying air to said combustion equipment;

fuel supply means for supplying fuel to said combustion equipment, the amount of fuel being in proportion to the amount of air supplied to said combustion equipment;

pipe means provided between said intake pipe of said internal combustion engine and said combustion equipment for operatively communicating said combustion equipment with said intake pipe;

valve means disposed in said pipe means for opening the passage of said pipe means to thereby communicate said combustion equipment with said intake pipe said valve means responding to at least one of the parameters representing the operating conditions of said internal combustion engine to control the opening degree of said passage, whereby the amount of burned gas in said combustion equipment to be supplied to said intake pipe through said pipe means is controlled to enable the optimum combustion of the air-fuel mixture in said combustion equipment; and an exhaust gas-recirculation pipe connected at one end thereof with the exhaust pipe of the internal combustion engine, the other end of said exhaust gas-recirculating pipe being connected with said pipe means at a portion thereof between said valve means and said combustion equipment, whereby a controlled portion of the burned gas from said combustion equipment is supplied to said intake pipe through said valve means and the remaining burned gas is supplied to said exhaust pipe through said exhaust gas-recirculation pipe, and further a portion of the exhaust gas at said exhaust pipe is recirculated into said intake pipe through said exhaust gas-recirculation pipe when the amount of gas to be recirculated into said intake pipe from said combustion equipment is insufficient for emission control.

3. In an internal combustion engine including an intake pipe and an exhaust pipe, a system for heating the intake pipe of the internal combustion engine comprising:

a combustion equipment disposed adjacent to said intake pipe for heating the same, and including a combustion chamber for burning an air-fuel mixture therein, and an ignition device disposed in said combustion chamber for igniting the air-fuel mixture;

air supply means comprising an air pump driven by the internal combustion engine and having an outlet connected to said combustion equipment for supplying air to said combustion chamber, the amount of the air being in response to at least one of the operating conditions of said internal combustion engine;

fuel supply means for supplying fuel to said combustion equipment, the amount of fuel being in proportion to the amount of air supplied to said combustion equipment;

pipe means provided between said intake pipe of said internal combustion engine and said combustion equipment for operatively communicating said combustion equipment with said intake pipe; and valve means disposed in said pipe means for opening the passage of said pipe means to thereby communicate said combustion equipment with said intake pipe, said valve means responding to at least one of the parameters representing the operating conditions of said internal combustion engine to control the opening degree of said passage, whereby the amount of burned gas in said combustion equipment to be supplied to said intake pipe through said pipe means is controlled to enable the optimum combustion of the air-fuel mixture in said combustion equipment.

4. A system for heating the intake pipe of the internal combustion engine as set forth in claim 3 further comprising:

an air control valve disposed between said outlet of said air pump and said combustion equipment for controlling the amount of air to be supplied from said air pump to said combustion equipment.

5. A system for heating an intake pipe of an internal combustion engine comprising:

a combustion equipment disposed adjacent to an intake pipe of an internal combustion engine for heating said intake pipe, and including a combustion chamber for burning the air-fuel mixture therein, and an ignition means disposed in said combustion chamber for igniting the air-fuel mixture;

air supply means for supplying air to said combustion equipment;

fuel supply means for supplying fuel to said combustion equipment, the amount of fuel being in proportion to the amount of air supplied to said combustion equipment;

an exhaust gas-recirculation valve including an inlet, an outlet and control means for communicating said inlet with said outlet, said control means controlling the amount of communication between said inlet and said outlet in response to at least one of the operating conditions of the internal combustion engine;

an outlet pipe provided between said outlet and said intake pipe;

an inlet exhaust gas-recirculation pipe provided between said inlet and said exhaust pipe; and an additional pipe provided between said inlet and said combustion equipment, whereby the gas to be recirculated into said intake pipe through said exhaust gas-recirculation valve for emission control is supplied from said combustion equipment and as occasion demands from said exhaust pipe, thereby enabling the optimum combustion of the air-fuel mixture in said combustion equipment and a reduction of harmful exhaust gas.

6. A system for heating the intake pipe of the internal combustion engine as set forth in claim 5, wherein said air supply means comprises an air pump driven by the internal combustion engine, said air pump having an outlet connected to said combustion equipment for supplying air to said combustion chamber, the amount of the air being in response to at least one of the operating conditions of said internal combustion engine.

7. A system for heating the intake pipe of the internal combustion engine as set forth in claim 6 further comprising:

an air control valve disposed between said outlet of said air pump and said combustion equipment for controlling the amount of air to be supplied from said air pump to said combustion equipment.

8. A system for heating an intake pipe of an internal combustion engine comprising:

a combustion equipment disposed adjacent to an intake pipe of an internal combustion engine for heating said intake pipe, and including a combustion chamber for burning the air-fuel mixture therein, and an ignition means disposed in said combustion chamber for igniting the air-fuel mixture;

fuel supply means for supplying fuel to said combustion equipment;

an air pump including an outlet;

an air supply pipe provided between said outlet of said air pump and said combustion equipment for supplying air to said combustion chamber;

an air control valve including an inlet port connected with said outlet of said air pump, an outlet port and control means for communicating said inlet port with said outlet port, said control means controlling the amount of communication between said inlet port and said outlet port in response to at least one of the operating conditions of the internal combustion engine;

a secondary air supply pipe provided between said outlet port of said air control valve and an exhaust pipe of the internal combustion engine, whereby the air from said air pump is supplied to said exhaust pipe and the amount thereof is controlled by said air control valve resulting in reduction of unburned exhaust gas;

pipe means provided between said combustion equipment and said intake pipe for operatively communicating said combustion equipment with said intake pipe; and valve means disposed in said pipe means for opening the passage of said pipe means to thereby communicate said combustion equipment with said intake pipe, said valve means responding to at least one of the parameters representing the operating conditions of said internal combustion engine to control the opening degree to said passage, whereby the amount of burned gas in said combustion equipment to be supplied to said intake pipe through said pipe means is controlled to enable the optimum combustion of the air-fuel mixture in said combustion equipment.

9. A system for heating an intake pipe of an internal combustion engine as set forth in claim 8 further comprising:

an exhaust gas-recirculation pipe connected at one end thereof with the exhaust pipe of the internal combustion engine, the other end of said exhaust gas-recirculation pipe being connected with said pipe means at a portion thereof between said valve means and said combustion equipment, whereby a controlled portion of burned gas from said combustion equipment is supplied to said intake pipe through said valve means and the remaining burned gas is supplied to said exhaust pipe through said exhaust gas-recirculation pipe, and further a portion of the exhaust gas at said exhaust pipe is recirculated into said intake pipe through said exhaust gas-recirculation pipe when the amount of gas to be recirculated into said intake pipe from said combustion equipment is insufficient for an emission control.

10. A system for heating an intake pipe of an internal combustion engine comprising:

a combustion equipment disposed adjacent to an intake pipe of an internal combustion engine for heating said intake pipe, and including a combustion chamber for burning the air-fuel mixture therein and an ignition means disposed in said combustion chamber for igniting the air-fuel mixture;

an air pump driven by said internal combustion engine and including an outlet;

an air control valve including an inlet port connected to said outlet of said air pump, an outlet port and control means for communicating said inlet port with said outlet port, said control means controlling the amount of communication between said inlet port and said outlet port in response to at least one of the operating conditions of the internal combustion engine;

an air supply pipe provided between said outlet port of said air control valve and said combustion equipment for supplying air from said air pump to said combustion equipment, the amount of the air being controlled by said air control valve;

fuel supply means for supplying fuel to said combustion equipment, the amount of the fuel being in proportion to the amount of the air supplied to said combustion equipment;

a secondary air supply pipe provided between said outlet of said air pump and an exhaust pipe of the internal combustion engine, whereby the remaining air from said air pump is supplied to said exhaust pipe to reduce the unburned exhaust gas;

pipe means provided between said combustion equipment and said intake pipe for operatively communicating said combustion equipment with said intake pipe; and valve means disposed in said pipe means for opening the passage of said pipe means to thereby communicate said combustion equipment with said intake pipe, said valve means responding to at least one of the parameters representing the operating conditions of said internal combustion engine to control the opening degree of said passage, whereby the amount of burned gas in said combustion equipment to be supplied to said intake pipe through said pipe means is controlled enabling the optimum combustion of the air-fuel mixture in said combustion equipment.

11. A system for heating an intake pipe of an internal combustion engine comprising:
   a first means disposed adjacent to an intake pipe of an internal combustion engine for burning the air-fuel mixture to thereby heat said intake pipe;
   a second means connected to said first means for supplying fuel to said first means;
   a third means connected to said first means for supplying air to said first means;
   a fourth means provided between said first means and said intake pipe for enabling the flow of burned gas in said first means from said first means to said intake pipe; and
   a fifth means coupled to said fourth means for controlling the amount of said flow in response to at least one of the operating conditions of the internal combustion engine and for keeping the pressure in said first means around atmospheric pressure to enable the stable combustion of said air-fuel mixture in said first means, thereby enabling the optimum combustion of the air-fuel mixture in said first means.

12. In an internal combustion engine including:
   a combustion chamber for firing an air-fuel mixture;
   an intake pipe for supplying said air-fuel mixture to said combustion chamber,
   an exhaust pipe connected to said combustion chamber for introducing the exhaust gas to the atmosphere, and
   a combustion equipment disposed adjacent to said intake pipe for heating said pipe to thereby ensure the complete combustion of said air-fuel mixture in said combustion chamber,
   a method for heating said intake pipe comprising the steps of:
   supplying air to said combustion equipment;
   supplying fuel to said combustion equipment, the amount thereof being so controlled as to be in proportion to the amount of said air supplied thereto;
   burning the air-fuel mixture in said combustion equipment;
   keeping the pressure in said combustion equipment around atmospheric pressure to enable the stable combustion of said air-fuel mixture in said combustion equipment;
   supplying the burned gas in said combustion equipment to said intake pipe; and
   controlling the amount of burned gas to be supplied to said intake pipe in response to at least one of the operating conditions of the internal combustion engine.

* * * * *